March 31, 1936. E. E. WEMP 2,036,005
CLUTCH STRUCTURE
Filed May 25, 1933 2 Sheets-Sheet 1

INVENTOR.
ERNEST E. WEMP.
BY Barnes, Kisselle & Laughlin
ATTORNEYS.

March 31, 1936.   E. E. WEMP   2,036,005
CLUTCH STRUCTURE
Filed May 25, 1933   2 Sheets-Sheet 2
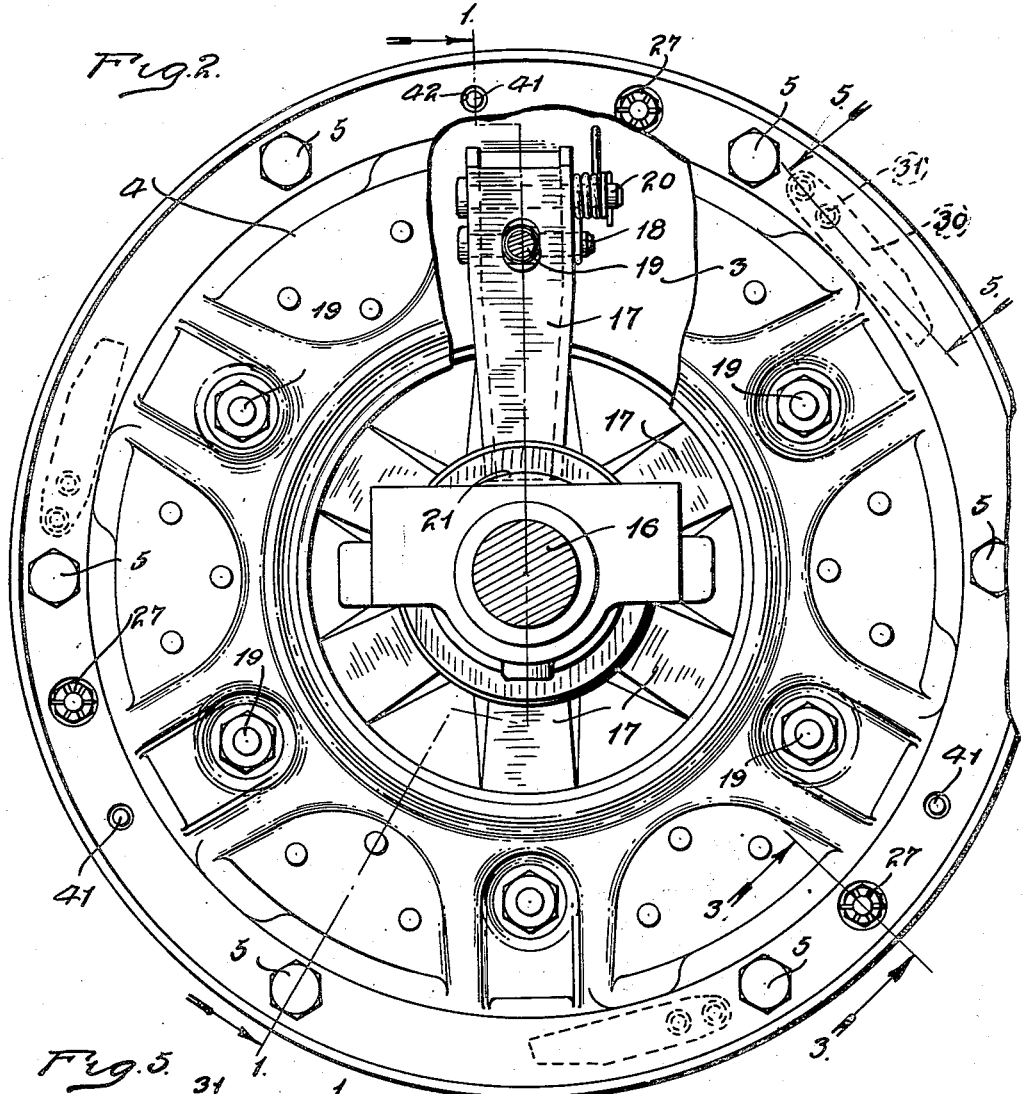
Fig.2.
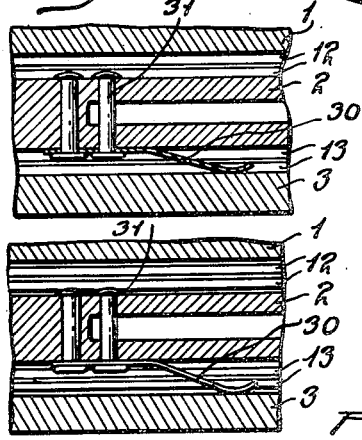
Fig.5.
Fig.6.
INVENTOR.
ERNEST E. WEMP.
BY Barnes, Kisselle & Laughlin
ATTORNEYS.

Patented Mar. 31, 1936

2,036,005

UNITED STATES PATENT OFFICE 2,036,005

CLUTCH STRUCTURE

Ernest E. Wemp, Detroit, Mich.

Application May 25, 1933, Serial No. 672,796

7 Claims. (Cl. 192—69)

This invention has to do with a clutch structure of a type particularly useful in automotive vehicles. One object of the invention is to increase the life of clutch facings in a clutch having two or more driven discs. Another object of the invention is the provision of a gauging arrangement by means of which the condition of clutch facings may be ascertained without guess work and without disassembling the clutch.

A multiple disc clutch is shown in my Patent No. 1,717,534 of June 18, 1929. In such a clutch there is a forward driven disc packed between an engine flywheel and a pressure ring, and a rearward driven disc packed between this pressure ring and a second pressure ring. The present invention is concerned with certain improvements in this kind of a clutch. However, the gauging device may be used in a clutch involving only a single driven disc. Before further consideration of the objects and advantages of the invention it is believed that a detailed description of the clutch should be considered, and then the objects and advantages may more readily be understood.

Fig. 2 is a rear view of the clutch with part of the clutch cover cut away.

Fig. 3 is an enlarged sectional view taken substantially on line 3—3 of Fig. 2 showing the clutch parts engaged.

Fig. 4 is a sectional view similar to Fig. 3 showing the clutch parts disengaged.

Fig. 5 is an enlarged sectional view looking substantially on line 5—5 of Fig. 2 showing the clutch engaged.

Fig. 6 is a view similar to Fig. 5 showing the clutch disengaged.

Fig. 7 is a fragmentary sectional view illustrating how the gauging device functions.

Figure 1:
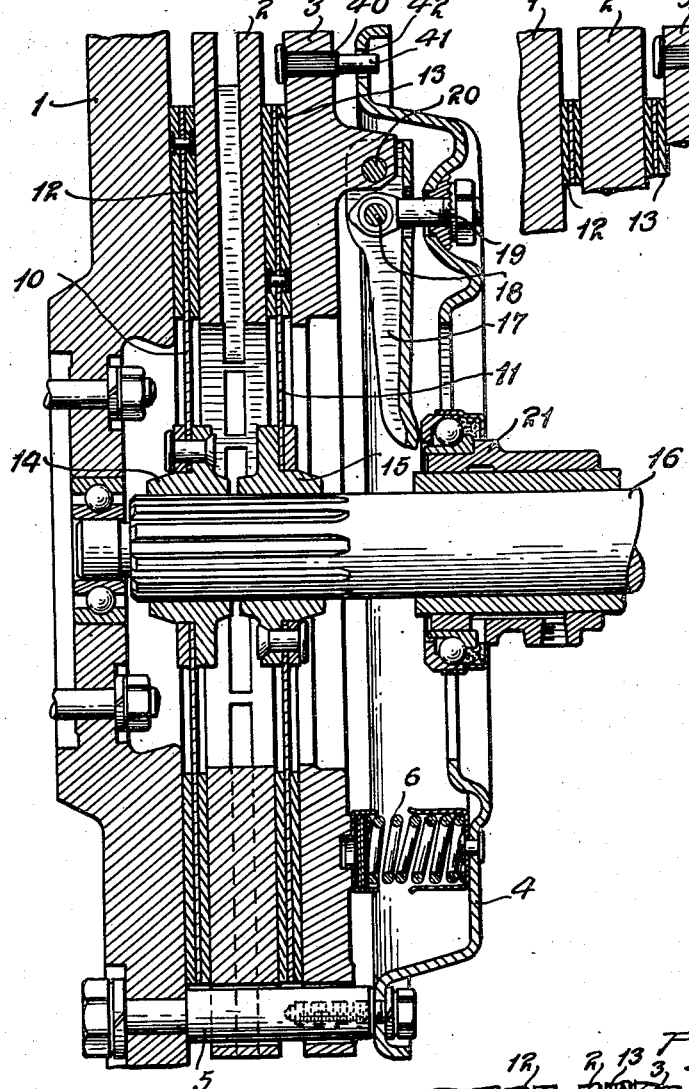
Fig. 1 is a sectional view taken through a clutch constructed substantially in accordance with the invention, and taken substantially on line 1—1 of Fig. 2.

One driving member of the clutch may comprise an engine flywheel 1; another driving member may comprise a pressure ring 2; another driving member may comprise a pressure ring 3; a clutch cover plate is shown at 4. Driving studs 5 may connect the flywheel and cover plate upon which the pressure rings 2 and 3 are slidably mounted, so that all are tied together for rotation in unison. A suitable number of clutch packing springs 6 react against the cover plate and upon the pressure ring 3.

Clutch driven discs are illustrated at 10 and 11, each having facing material 12 and 13. The driven disc 10 is adapted to be packed between the flywheel 1 and ring 2, and the disc 11 is adapted to be packed between the pressure rings 2 and 3 with the packing action effected by the springs 6. The driven discs have hubs 14 and 15 mounted upon a driven shaft 16 to drive the same, and for axial movement thereon. Clutch releasing levers 17 are pivoted as at 18 on studs 19 supported by the cover plate, and are pivotally connected as at 20 to the pressure ring 3. A reciprocable clutch throw-out member is shown at 21.

It will be readily appreciated how the member 21 may be shifted from right to left, as Fig. 1 is viewed, thus rocking the levers on their fulcrum points 18 and withdrawing the pressure ring 3 to relieve the packing pressure in the act of disengaging the clutch.

The two pressure rings are connected by bolts or studs as illustrated in Figs. 3 and 4. This may be done by bolt members 25 each fitted snugly into the ring 2 and freely slidable in an aperture 26 in the ring 3. A nut 27 may be screw threaded on the end of the bolt and one end of the nut is preferably rounded or made somewhat frusto-conical in shape, as illustrated at 28, and the aperture 26 is countersunk at 29. When the clutch is engaged, as shown in Fig. 3, the rounded portion of the nut is spaced from the countersunk portion of the aperture. When the ring 3 is withdrawn to release the clutch it may be retracted alone until the nut seats in the countersunk portion 29. Thereupon further retraction causes the ring 3 to withdraw the pressure ring 2 as illustrated in Fig. 4. This positively frees the forward disc 10. The normal clearance between the nut 28 and the countersunk portion determines the clearance between the pressure rings 2 and 3 when the clutch is disengaged and this may be adjusted by adjusting the nuts 27. By reference to Fig. 2 it will be noted that there may be three of such withdrawing bolts 25 and corresponding nuts 27. After the pressure ring 3 is withdrawn to the place where it abuts the nuts 27, further movement of the throw-out member 21 shifts the two pressure rings bodily and the amount of shift determines the amount of clearance between the flywheel 1 and the pressure ring 2 and this may vary depending upon individual operators. It will be understood that the clutch throw-out member 21 may be shifted by the usual clutch pedal in an automobile.

Means are provided for holding the rings 2 and 3 separated when the clutch is disengaged. Such means may be springs in the form of flat springs 30 which may be secured by rivets 31 to the pressure ring 2 and which are shaped to react against the pressure ring 3. Fig. 5 shows the parts in clutch-engaged position and Fig. 6 shows the parts in disengaged position. The springs tend to spread the rings 2 and 3. Accordingly, upon disengagement of the clutch the pressure ring 3 is retracted but the springs 30 hold the ring 2 packed against the forward disc until the pressure ring 2 is picked up and moved by the bolts 26. The springs thus insure positive release of the rear disc 11, and the disc 10 is positively released as the two pressure rings are retracted together as a unit away from the flywheel 1.

The most important action takes place when the clutch is engaged and this action is as follows: Both pressure rings shift forwardly toward the flywheel as the throw-out member 21 is allowed to shift from left to right as Fig. 1 is viewed, and the first clutching engagement takes place on the facing 12 of the forward disc as it becomes packed between the flywheel and the ring 2. This engagement of the clutch may have a torque capacity determined by the strength of the springs 30. Accordingly, the disc 10 is the first one to be engaged, and following this, as the pressure ring 3 is allowed to move forward toward the flywheel, and toward the ring 2, the rear disc 11 becomes packed between the pressure rings. The springs 6 are much stronger than springs 30 and accordingly collapse the same when the clutch is engaged. In a multiple disc clutch of this kind one driven disc is engaged before the other, and some of the objects of this invention are effectively carried out by the arrangement of parts above described for effecting engagement of the forward disc before engagement of the rearward disc.

The forward disc has an immediate environment which is more advantageous than the rearward disc from the standpoint of thermal condition. The forward disc is packed against the flywheel, and the flywheel consists of a relatively large mass of metal usually thicker than the pressure rings and having more metal by reason of the fact that the flywheel extends to the center where it is mounted. This mass of metal serves to dissipate the heat generated adjacent the forward disc more effectively than the dissipation of the heat for the rearward disc, which is engaged only between pressure rings. This advantage which the forward disc has over the rear disc is at least one factor which has heretofore resulted in the fact that the forward disc had a life considerably longer than the life of the rear disc. In other words, the clutch facing material on the rear disc wore away with more rapidity than the wearing away of the clutch facings on the forward disc. Another factor in this connection insofar as my previous patent is concerned, very probably, was the fact that the rear disc was the first one to be engaged. This resulted in a greater amount of slippage and heat generation on the disc less adapted, by its environment, to take this additional work. Accordingly, the present invention is so arranged as to place the initial engagement of the clutch upon the forward disc to offset its otherwise natural advantage over the rear disc from a thermal standpoint, and to save the rear disc at the expense of the forward disc. The result is that the rear disc is saved somewhat, and the forward disc, due to its otherwise advantageous conditions, lasts longer than would the rear disc if the rear disc were the first to be engaged. The ultimate advantage is longer clutch facing wear.

A further feature of the invention is that the construction serves to stabilize the intermediate driving ring 2 when the clutch is disengaged. The ring 3 attains some support from the control levers. The ring 2, where it is mounted upon the studs 5, has some clearance for metal expansion purposes due to the heat, so that when the clutch is disengaged the pressure ring 2 may shift back and forth relative to the studs 5 striking the same and possibly creating some objectionable noises. The rounded nuts 27 fitting into the counterbores 29, however tend to centralize the pressure ring 2, and also the springs 30 frictionally tend to resist any abnormal movements of the pressure ring 2 on the studs 5. It might be pointed out that the particular clutch shown herein is one designed for fairly heavy duty, as for example, in busses, and trucks or the like.

The gauging device is particularly desirable in heavy duty clutches for commercial purposes, since the operators of these vehicles want to get all the clutch wear they possibly can, but of course, the gauging device may be used in any kind of a vehicle. It may take the form of a stud 40 secured to a clutch member such as the pressure ring 3. The stud may have a serrated portion press-fitted into the ring and it may have a projecting gauging end portion 41 arranged to extend through an opening 42 in the cover plate. In the initial set up, the stud projects through the cover plate as shown in Fig. 1. It will be appreciated that as the clutch facings wear and reduce in thickness, that the pressure ring 3, in clutch engaged position, shifts forwardly toward the flywheel. This shift may be detected by observing the position of the end of the stud 41. One advantageous arrangement is to so locate the parts that when the end of the stud 41 becomes substantially flush with the outside face of the cover plate surrounding the aperture 42, the clutch facings are worn to a point where replacement is necessary. Fig. 7 indicates the position the parts would take after considerable wear of the clutch facings, and here it will be noted that the end of the stud 41 is approaching the adjacent face of the clutch cover plate. There may be three of such studs as illustrated in Fig. 2. Thus, positive knowledge of the condition of the clutch facings may be obtained without disassembling the clutch, and with a proper usage of the gauge, there would be no danger of using the clutch after the clutch facings are worn so thin as to result in probable damage to the faces of the driving members.

I claim:—

1. In a clutch, the combination of an axially fixed driving member, axially shiftable driving members, driven members one each between adjacent driving members for frictional engagement therewith, clutch packing springs for packing the driving and driven members together, means for shifting one of the shiftable driving members against the packing springs, lost play means connecting the driving member which is shiftable by said means and another shiftable driving member, to pick up said other driving member and shift the same axially after a certain shift of the driving member which is shiftable by said means, and spring means reacting against the driving members so connected and tending normally to separate them axially.

2. In a clutch, the combination of an axially fixed driving member, two axially shiftable driving members, a pair of driven members one between the fixed driving member and a shiftable driving member and the other between the two shiftable driving members and for frictional engagement with the driving members, clutch packing springs for packing said members together, control means for retracting one driving member against the action of the packing springs, lost play means connecting the two shiftable driving members arranged to pick up one of the shiftable driving members and move it axially after certain movement of the other driving member as it is shifted by the control means whereby the shiftable driving members become spaced relative to each other and both shift away from the fixed driving member, and spring means between the two shiftable driving members tending normally to axially space them.

3. In a clutch, the combination of an axially fixed driving member, an axially shiftable driving member, a second axially shiftable driving member, a driven member between the fixed driving member and one shiftable member, a driven member between the two shiftable driving members, all of said members arranged for frictional engagement, packing springs for urging the members together in packed relation and acting directly upon the second shiftable driving member, control means arranged to hold the second shiftable driving member retracted against the springs, and lost play means connecting the shiftable driving members and arranged to hold the first shiftable driving member retracted axially from the fixed driving member, said control means being arranged to release the second mentioned driving member whereby the two shiftable driving members move axially together, to first engage the driven member between the fixed driving member and the first mentioned axially shiftable member and then engage the driven member between the two shiftable driving members.

4. In a clutch, the combination of an axially fixed driving member, an axially shiftable driving member, a second axially shiftable driving member, a driven member between the fixed driving member and one shiftable member, a driven member between the two shiftable driving members, all of said members arranged for frictional engagement, packing springs for urging the members together in packed relation and acting directly upon the second shiftable driving member, control means arranged to hold the second shiftable driving member retracted against the springs, lost play means connecting the shiftable driving members and arranged to hold the first shiftable driving member retracted axially from the fixed driving member, and spring means tending normally to hold the shiftable driving members separated and taking up the lost play in said connecting means when the second mentioned shiftable driving member is held retracted, said control means being arranged to release the second mentioned driving member, whereby the two shiftable driving members move axially together to first engage the driven member between the fixed driving member and the first mentioned axially shiftable member, and then engage the driven member between the two shiftable driving members.

5. In a clutch, the combination of a flywheel, two axially shiftable driving members, a cover plate, all of said members being connected to rotate together, two driven members, one between the flywheel and one shiftable driving member and for frictional engagement therewith, and the other between the two shiftable driving members and for frictional engagement therewith, clutch packing springs reacting between the cover plate and a shiftable driving member, means for retracting said last mentioned shiftable driving member against the action of the springs, lost play means interconnecting the two shiftable driving members for picking up the shiftable driving member next adjacent the flywheel and retracting the same axially, and one or more springs interposed between the shiftable driving members tending normally to hold them separated 6. In a clutch, the combination of an axially fixed driving member, two axially shiftable driving members, a cover plate, driving studs connecting the driving members and cover plate with the shiftable driving members slidable on the studs, two driven discs between the driving members and for frictional engagement therewith, packing springs for packing the driving members and driven discs together, means for retracting one of the shiftable driving members, bolts snugly attached to one shiftable driving member, the other driving member having apertures therein through which the bolts freely pass, said apertures being counterbored, and rounded abutment means on the bolts normally spaced from the counterbores, and adapted to seat therein to retract one of the shiftable driving members from the other, and serving to centralize one of the shiftable driving members.

7. In a clutch, the combination of a flywheel disposed in an axially fixed position, a clutch cover plate secured to the flywheel and axially fixed with respect thereto, said cover plate having a aperture therein, said flywheel constituting a clutch driving member, an axially shiftable clutch driving plate secured to rotate with the flywheel and cover plate, a driven disc disposed between the flywheel and driving plate and having facings thereon subject to wear in use, clutch packing springs acting upon the driving plate and reacting on the cover plate for engaging the clutch, means for retracting the plate against the action of the springs to release the clutch, said plate progressively shifting toward the flywheel in clutch engaged position as the said facings wear, and a stud fixed to the plate and projecting axially therefrom through said aperture in the cover plate for free movement in the aperture as the plate is shifted for clutch engagement and release and for movement relative to the plate incident to facing wear, the end of the stud being visible outside the cover plate for indicating the worn condition of the facings.

ERNEST E. WEMP.